(12) United States Patent
Frank

(10) Patent No.: US 8,998,348 B2
(45) Date of Patent: Apr. 7, 2015

(54) HYDRAULIC BRAKE ARCHITECTURES FOR AIRCRAFTS FOR BRAKING AT LEAST ONE WHEEL OF THE AIRCRAFT

(75) Inventor: David Frank, Paris (FR)

(73) Assignee: Messier-Bugatti-Dowty, Velizy-Villacoublay (FR)

(*) Notice: Subject to any disclaimer, the term of this patent is extended or adjusted under 35 U.S.C. 154(b) by 92 days.

(21) Appl. No.: 13/411,810

(22) Filed: Mar. 5, 2012

(65) Prior Publication Data

US 2012/0223572 A1 Sep. 6, 2012

(30) Foreign Application Priority Data

Mar. 4, 2011 (FR) ...................................... 11 51799

(51) Int. Cl.
| | | |
|---|---|---|
| *B64C 25/44* | (2006.01) | |
| *B60T 13/58* | (2006.01) | |
| *B60T 8/00* | (2006.01) | |
| *B60T 13/66* | (2006.01) | |
| *B60T 13/68* | (2006.01) | |

(52) U.S. Cl.
CPC ................. *B60T 8/00* (2013.01); *B60T 13/662* (2013.01); *B60T 13/686* (2013.01); *B64C 25/44* (2013.01)

(58) Field of Classification Search
CPC ......... B60T 17/22; B60T 13/14; B60T 13/68; B60T 13/662; B60T 13/686; B60T 8/00; B60T 8/325; B60T 8/1703; B64C 25/44
USPC .............. 303/14, 113.1, 3, 115.4, 15, 112.03, 303/115, DIG. 9, 10, 6.01, 2; 188/151 A, 188/106 P; 244/111, 110 A See application file for complete search history.

(56) References Cited

U.S. PATENT DOCUMENTS

| | | | | |
|---|---|---|---|---|
| 4,834,465 | A * | 5/1989 | Guichard et al. ................ | 303/15 |
| 5,397,173 | A * | 3/1995 | Bourguet ........................... | 303/2 |
| 6,966,614 | B2 * | 11/2005 | Hamzeh et al. ................... | 303/10 |
| 2002/0057012 | A1* | 5/2002 | Bourguet et al. .......... | 303/113.1 |
| 2004/0195909 | A1* | 10/2004 | Hamzeh et al. .................. | 303/10 |
| 2004/0239173 | A1* | 12/2004 | Williams et al. .................. | 303/3 |

FOREIGN PATENT DOCUMENTS

| | | | |
|---|---|---|---|
| EP | 1 205 369 A1 | 5/2002 | |
| WO | WO 2004/108496 A1 | 12/2004 | |

\* cited by examiner

*Primary Examiner* — Anna Momper
*Assistant Examiner* — San Aung
(74) *Attorney, Agent, or Firm* — Sughrue Mion, PLLC

(57) ABSTRACT

Aircraft hydraulic parking architecture, including a brake with a wheel braking hydraulic actuator, a pressure source (Alim) of high-pressure fluid, a normal braking hydraulic circuit (C1) including at least pressure control servo valve with a supply port (P) connected to the pressure source (Alim), a return port (R), a utilization port (U) connected to the actuator, the brake architecture further including a parking hydraulic circuit (C2) including a parking brake valve (PkBV) having an outlet port (Ps1) selectively connected either to the pressure source (Alim) or a low-pressure return circuit (CR).
The outlet port (Ps1) of the parking brake valve (PkBV) is connected to the return port (R) of the pressure control servo valve.

4 Claims, 2 Drawing Sheets

HYDRAULIC BRAKE ARCHITECTURES FOR AIRCRAFTS FOR BRAKING AT LEAST ONE WHEEL OF THE AIRCRAFT

BACKGROUND OF THE INVENTION

The invention concerns the field of hydraulic brake architectures for aircrafts for braking at least one wheel of the aircraft.

There is known a brake architecture for aircraft wheels of the type described with reference to FIG. 1. This prior art architecture comprises:
- at least one brake provided with at least one hydraulic actuator for braking the wheel,
- at least one pressure source Alim adapted to deliver a hydraulic fluid at high pressure; and
- a normal braking hydraulic circuit C1.

This normal braking hydraulic circuit C1 includes at least one pressure control servo valve BCV including:
- a supply port P connected (directly or indirectly) to the pressure source Alim;
- a return port R;
- a utilization port U connected to the braking hydraulic actuator; and
- a mobile slide valve adapted to be commanded to associate the utilization port U with the supply port P and the return port R so that the pressure in the utilization port is equal to a pressure set point.

The FIG. 1 brake architecture further includes a parking hydraulic circuit C2 including a parking brake valve PkBV having an outlet port Ps1 adapted to be connected selectively either to the pressure source Alim or to a return circuit CR at a pressure that is low relative to said high pressure.

The outlet of the parking brake valve and the outlet of the servo valve here form the inlets of a shuttle valve the outlet of which is connected to the braking actuator.

Accordingly, for parking braking, it suffices to manoeuvre the parking brake valve to connect its outlet to the supply source. The high pressure is thus communicated to the inlet of the shuttle valve and is transmitted to the braking actuator.

The pressure of the low-pressure fluid in the return circuit is typically of the order of 5 bar. This positive pressure in the return circuit CR enables reduction of the risk of gas appearing in the return circuit. The pressure of the high-pressure fluid from the supply source Alim is typically 206 bar.

A drawback of such a prior art brake architecture is to have part of the hydraulic energy produced at the level of the high-pressure source Alim that is lost in the form of hydraulic leaks toward the return circuit CR.

In particular, during normal braking phases (or parking braking) during which the pressure source is unavailable, the circuit C1 or the circuit C2 is pressurized by an accumulator. Now, because of leaks from the equipments of the circuit C1, the accumulator is eventually emptied and no longer able to provide a sufficient pressure level after a few actuations of the brakes.

OBJECT OF THE INVENTION

An object of the invention is to propose a new brake architecture having a reduced level of leakage.

SUMMARY OF THE INVENTION

To achieve the above aim, there is proposed a hydraulic brake architecture for aircrafts, including at least one wheel, the architecture including:
- at least one brake provided with at least one hydraulic actuator for braking the wheel,
- at least one pressure source adapted to deliver a hydraulic fluid at high pressure; and
- a normal braking hydraulic circuit.

This normal braking hydraulic circuit further including:
- at least one pressure control servo valve including:
- a supply port connected to the pressure source;
- a return port;
- a utilization port connected to the braking hydraulic actuator; and
- distribution means, such as a slide valve, mounted so as to be mobile so as to connect the utilization port either with the supply port or with the return port.

The brake architecture further includes a parking hydraulic circuit including a parking brake valve having an outlet port adapted to be connected selectively either to the pressure source or to a return circuit at a pressure that is low relative to said high pressure and the outlet port of the parking brake valve being connected to the return port of the pressure control servo valve.

Thanks to the architecture of the invention, the overall leakage flow rate of the brake architecture may be reduced. The leakage flow rate is reduced because:
- the brake architecture of the invention includes fewer equipments liable to leak (as indicated hereinafter, the architecture of the invention enables the shuttle valve to be dispensed with); and
- in the brake architecture of the invention, the hydraulic components provided with three ports are connected with priority in such a manner as to reduce situations in which the three ports of the same hydraulic component would be subjected to different pressures (on a component provided with at least three ports leakage occurs when the three ports are no longer at the same pressure).

In particular, in this architecture leakage is reduced because the supply, utilization and return ports of the pressure control servo valve may be brought to the same pressure (this reduces the flow rate of hydraulic fluid via the return port). Given that in a prior art aircraft brake architecture there are generally as many shuttle valves as there are wheels to be braked (i.e. at least eight wheels and eight shuttle valves), the brake architecture of the invention is commensurately more beneficial for the reduction of leaks. If the architecture of the invention is implemented on an aircraft having eight wheels, eight shuttle valves may potentially be eliminated and the overall leakage greatly reduced.

The reduction of leakage is all the more remarkable if the parking brake is actuated to supply the hydraulic actuator with pressurized fluid via the parking brake valve. The hydraulic fluid source is then connected to the outlet port of the parking brake valve which, because of its connection to the return port of the servo valve, creates a high pressure at the level of the return valve of the pressure control servo valve and prevents that component from leaking.

Another advantage of the invention compared to the FIG. 1 prior art brake architecture is that normal braking (via only the normal circuit) and parking braking (via the parking circuit) may be effected without necessitating a shuttle valve for selecting supplying the actuator via the normal braking circuit or via the parking brake circuits, whence a saving in weight, an improvement in terms of the general reliability of the braking system, and an economic saving.

BRIEF DESCRIPTION OF THE DRAWINGS

Other features and advantages of the invention will emerge clearly from the description given hereinafter by way of non-limiting illustration and with reference to the appended drawings, in which.

DETAILED DESCRIPTION OF THE INVENTION

Figure 1:
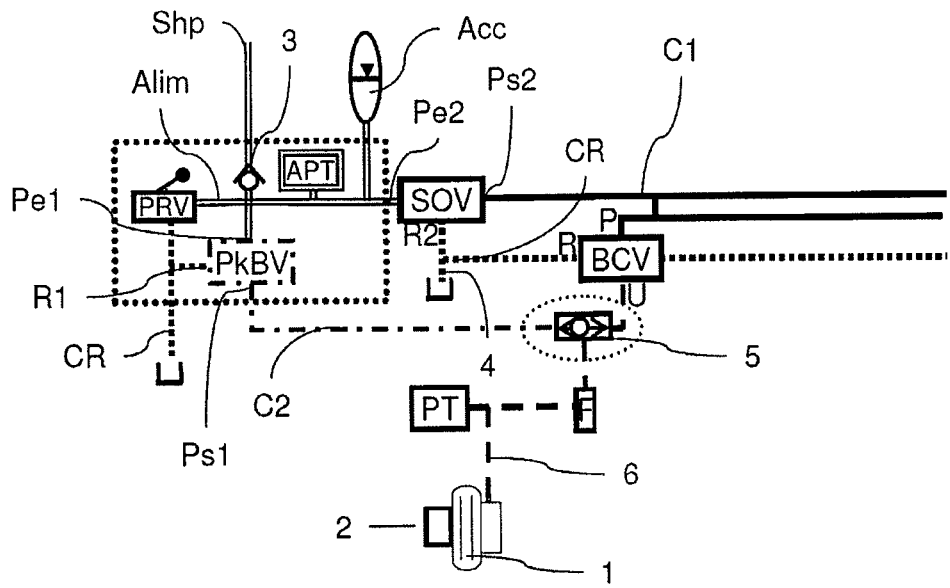
FIG. 1 shows a prior art aircraft brake architecture.

There is seen in FIG. 1 a prior art aircraft brake architecture. The aircraft includes landing gear that includes wheels and at least one wheel 1 of which is mounted to rotate about a wheel axis.

To brake the wheel 1 a braking hydraulic actuator 2 is used provided with at least one hydraulic cavity and adapted to press rotor disks secured to the wheel against stator disks secured to a fixed part of the landing gear of the aircraft.

For reasons of efficient braking, the aim is to regulate the braking torque or the braking force during landing or rolling phases. To this end a normal braking hydraulic circuit C1 is used provided with a pressure control servo valve BCV enabling regulation of the fluid pressure delivered to the actuator.

When the aircraft is parked, the aim is only to lock the brakes without regulating the pressure delivered to the actuator 2 or the braking force applied to the wheel 1. For this there is used not the normal braking hydraulic circuit C1 but a parking braking hydraulic circuit C2 which pressurizes the braking actuator 2 via a parking brake PkBV of this circuit C2 that is either fully open or fully closed.

The parking and normal braking hydraulic circuits C1, C2 are fed with hydraulic fluid at high pressure by a pressure source Alim. This hydraulic pressure source Alim includes a high-pressure hydraulic fluid supply Shp and an accumulator Acc of hydraulic fluid under pressure connected to the supply Shp via a pipe provided with a check valve 3. This valve 3 allows fluid to pass from the supply Shp to the accumulator Acc and prevents hydraulic fluid from passing from the accumulator Acc to the high-pressure hydraulic fluid supply Shp.

The function of this hydraulic supply Shp is to supply to the rest of the brake architecture a hydraulic fluid at high pressure. The function of the accumulator Acc is to accumulate a volume of fluid at high pressure provided by the supply to supply it to the rest of the architecture in the event of failure or non-functioning of the high-pressure hydraulic supply Shp. The function of the check valve 3 is to prevent fluid from returning to the hydraulic supply Shp, in particular in the event of a pipe breaking in the high-pressure line Shp.

The pressure source Alim further includes a pressure regulator valve PRV that is connected on the one hand to the accumulator Acc and on the other hand to a return circuit CR containing a hydraulic fluid at a low pressure. This pressure regulator valve PRV is adapted to allow hydraulic fluid to pass from the supply source to the return circuit if the pressure of the fluid in the supply source Alim exceeds a predetermined value. The pressure regulator valve PRV constitutes a safety feature for preventing excess fluid pressure in the brake architecture. The hydraulic pressure source Alim includes an accumulator pressure transducer APT for measuring the hydraulic fluid pressure at the outlet from the accumulator Acc, this pressure corresponding to the maximum supply pressure that can be delivered to the normal braking circuit C1 and the parking brake circuit C2.

The prior art normal braking hydraulic circuit C1 includes a fluid inlet control valve SOV having an inlet port Pe2 connected to the supply source Alim (in this instance at the level of the accumulator Acc) and an outlet port Ps2 connected to the supply port P of the pressure control servo valve BCV.

This fluid inlet control valve SOV further includes a return port R2 that is connected to the return port R of the pressure control servo valve BCV. The return ports R and R2 are connected to each other and to the return circuit CR via a dedicated pipe 4.

This fluid inlet control valve SOV is placed selectively in a normal braking hydraulic circuit C1 supply configuration or in a configuration cutting off the supply to the normal braking hydraulic circuit C1.

In the configuration of supplying the normal braking hydraulic circuit C1:
the connection between the inlet port Pe2 and the outlet port Ps2 of the control valve SOV is allowed; and
the connection of the return port R2 of the fluid inlet control valve SOV with its inlet port Pe2 and its outlet port Ps2 is not allowed.

In the configuration cutting off the supply of the normal braking hydraulic circuit C1:
the connection between the inlet port Pe2 and the outlet port Ps2 of the control valve SOV is not allowed; and
the connection of the return port R2 of the fluid inlet control valve SOV with its only outlet port Ps2 is allowed.

In the configuration cutting off the supply of the normal braking hydraulic circuit C1 the hydraulic circuit C1 is goes to the return over the whole of that portion thereof between the valve SOV and the servo valve BCV.

The parking brake valve PkBV of the parking brake circuit C2 includes an outlet port Ps1 adapted to be connected selectively either to the pressure source Alim, in this instance via an inlet port Pe1 of this parking brake valve PkBV, or to the return circuit CR at a pressure that is low relative to said high pressure. In this instance this connection of the outlet port Ps1 of the parking brake valve PkBV to the return circuit CR is effected via a return port R1 of the valve PkBV.

The hydraulic supply of the braking actuator 2 is effected via a shuttle valve 5 including an outlet connected to the actuator 5 and two inlets connected to the outlet port Ps1 of the parking brake valve PkBV and to the utilization port U of the servo valve BCV.

The valve 5 supplies the actuator 2 by connecting it to the inlet of the valve 5 at the higher fluid pressure.

Following debris being thrown up from the runway or a tyre bursting, leaks may occur between the shuttle valve 5 and the braking actuator 2.

To reduce the volume of fluid lost on such leaking, the architecture includes a fuse F disposed between the shuttle valve 5 and the braking actuator 2. This fuse F is adapted to prevent fluid from passing from the shuttle valve 5 toward the braking actuator 2 if a leak is detected between the fuse F and the braking actuator 2.

The brake architecture represented in FIG. 2 includes a pressure source Alim identical to the pressure source Alim already described with reference to FIG. 1. This pressure source Alim is also connected to the return circuit CR at low pressure in the same manner as in the FIG. 1 architecture.

This brake architecture of the invention includes various elements that are identical to those already described with reference to FIG. 1. There are found again here:
a brake provided with at least one hydraulic actuator 2 for braking the wheel 1;
a normal braking hydraulic circuit (C1) provided with a pressure control servo valve BCV (identical to the servo valve BCV from FIG. 1) and a fluid inlet control valve SOV (identical to the valve SOV from FIG. 1).

The servo valve BCV used in the brake architecture of the invention may be a servo valve of the type disclosed by U.S.

Pat. No. 3,856,047. This servo valve enables movement of the slide valve to be regulated as a function of:
- a braking set point; and
- the hydraulic pressure at the level of the utilization port U.

There is also found again in the brake architecture of the invention a parking hydraulic circuit C2 including a parking brake valve PkBV identical to that already described with reference to FIG. 1.

A major difference between the invention and the FIG. 1 prior art is that the outlet port Ps1 of the parking brake valve PkBV is connected to the return port R of the pressure control servo valve BCV.

Given that the return port R of the servo valve BCV is no longer connected to the low-pressure return circuit CR, but is connected directly to the outlet port Ps1 of the parking brake valve PkBV, it is no longer necessary to use a shuttle valve 5 as in FIG. 1. Accordingly, the utilization port U of the servo valve BCV from FIG. 2 is connected to the braking actuator 2 by a pipe 7 on which are placed only a fuse F and a pressure sensor PT identical to those from FIG. 1.

The brake architecture of the invention thus enables the braking actuator 2 to be supplied with hydraulic fluid under pressure:
- either via the pressure control servo valve BCV without passing through the parking brake valve PkBV, i.e. by actuating normal braking;
- or via the braking valve PkBV and the servo valve BCV, i.e. by actuating parking braking.

By positioning the servo valve BCV to connect its return port R to its utilization port U, the supply source Alim is then connected to the braking actuator 2 via the communicating ports Ps1 and Pe1 of the parking brake valve PkBV and via the return port R and the utilization port U of the servo valve BCV. Moreover, the fact that the circuit C2 is connected to the return port R2 of the fluid inlet control valve SOV means that when parking braking is actuated the port R2 is at the same pressure as the ports Pe2 and Ps2, in this instance at the high pressure.

As indicated above, leakage from a hydraulic element provided with three ports (such as the valve SOV or the servo valve BCV) exists as soon as there is a pressure difference between two of the three ports. The architecture of the invention reduces the risk of this type of situation occurring. For example, leaks from the pressure control servo valve BCV via the port R are eliminated by equalizing the pressure at its three ports.

The brake architecture of the invention that includes an accumulator Acc and limits the leaking of fluid toward the return circuit CR enables a saving in mass and in volume because there is no longer any shuttle valve, and also a saving in mass and in volume because the accumulator may be reduced in size relative to the prior art architecture (leaks are reduced and so less fluid need be stored).

Aeronautical standards impose that after a given time of stopping of the hydraulic supply Shp (generally of 12 hours) the brake architecture be able to operate a certain number of times to enable braking of the wheel 1 without using the hydraulic supply Shp. The accumulator Acc is consequently sized to provide this function and the fact of limiting leaks to the return circuit thus enables this same braking function to be effected if the hydraulic supply Shp should fail using an accumulator of reduced size compared to the prior art. This therefore reduces the mass of hydraulic fluid under pressure to be stored without affecting the braking capacity of the brake architecture.

It will finally be noted that the inlet port Pe2 of the fluid inlet control valve SOV is connected to the supply source Alim (as in FIG. 1) and its outlet port Ps2 is connected to the supply port P of the pressure control servo valve BCV. In contrast, the return port R2 of the fluid inlet control valve SOV is no longer connected directly to the low-pressure return circuit CR as in FIG. 1 but it is connected to the outlet port Ps1 of the parking brake valve PkBV and to the return port R of the pressure control servo valve BCV.

Thus return of fluid from the outlet port Ps2 of the fluid inlet control valve SOV to the low-pressure return circuit CR is allowed via the same pipe as connects the outlet port Ps1 of the parking brake valve PkBV and the return port R of the pressure control servo valve BCV.

In this embodiment, including a fluid inlet control valve SOV with three ports, it is necessary to connect its port R2 with the outlet port Ps1 of the valve PkBV and not directly to the return circuit CR. This connection of the ports R2 and Ps1 prevents the risk of fluid passing from the port R2 toward the return circuit when the port R is supplied with fluid under pressure via the valve PkBV (i.e. during parking braking). Such a risk would exist if the port R2 were connected directly to the return circuit CR because fluid under pressure could pass from the port Ps1 of the valve PkBV to the return circuit via the ports R then P then Ps2 then R2 then CR.

This return of the outlet Ps2 of the fluid inlet control valve SOV is beneficial when it is required to limit the pressure in the normal braking circuit so that it tends toward the low pressure of the return circuit CR, thereby preventing the brakes from being actuated accidentally by the normal braking circuit.

Figure 2:
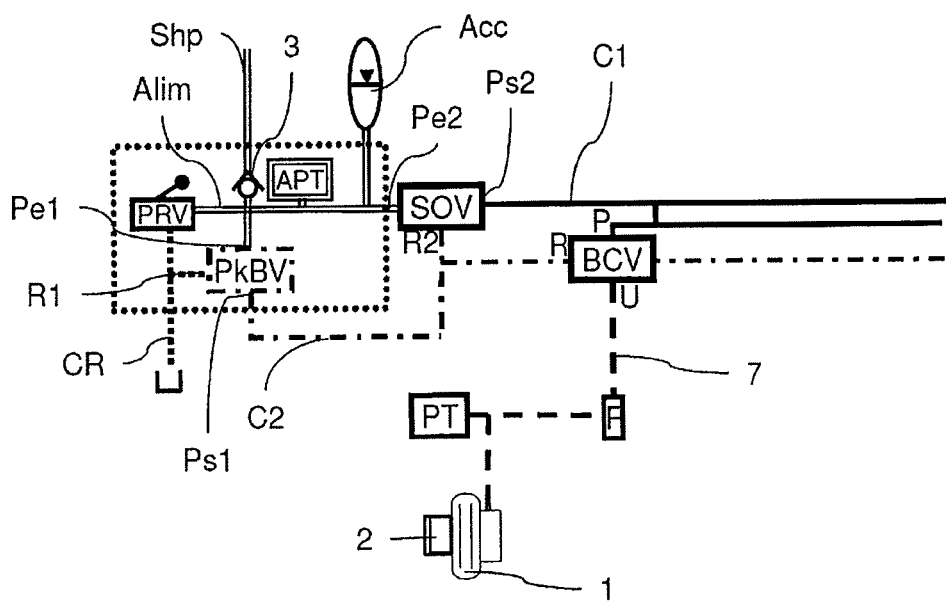
FIG. 2 shows an aircraft brake architecture of the invention.
Figure 3:
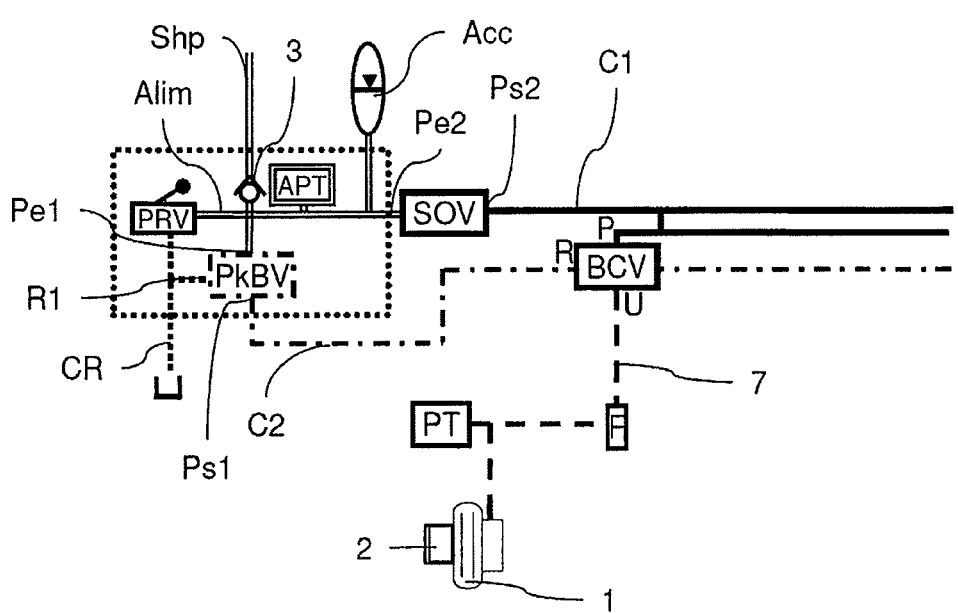
FIG. 3 shows an aircraft brake architecture of the invention that is an alternative to that shown in FIG. 2.

Note that the invention encompasses another embodiment shown in FIG. 3. In the FIG. 3 embodiment, the fluid inlet control valve SOV is no longer a three-port valve with a return port R2 as in FIG. 2, but this valve SOV is a two-port valve having an inlet port Pe2 and an outlet port Ps2 and including no return port R2. Apart from this difference as to the nature of the valve SOV, the brake architecture of the embodiment shown in FIG. 3 is identical to that described with reference to FIG. 2.

In the FIG. 3 embodiment, the fluid inlet control valve SOV has an inlet port Pe2 connected to the supply source Alim and an outlet port Ps2 connected to the supply port P of the pressure control servo valve BCV, this fluid inlet control valve (SOV) selectively adopting:
- a configuration of supplying the normal braking hydraulic circuit in which the connection between the inlet port (Pe2) and the outlet port (Ps2) of the control valve (SOV) is allowed; and
- a configuration cutting off the supply of the normal braking hydraulic circuit in which the connection between the inlet port Pe2 and the outlet port Ps2 of the control valve SOV is not allowed.

As in the FIG. 2 embodiment, the FIG. 3 embodiment enables the shuttle valve 5 from the FIG. 1 architecture to be dispensed with and further enables the braking actuator 2 to be supplied with hydraulic fluid under pressure:
- either via the pressure control servo valve BCV without passing through the parking brake valve PkBV, i.e. by actuating normal braking;
- or via the braking valve PkBV and the servo valve BCV, i.e. by actuating parking braking.

The invention claimed is:

1. A hydraulic brake architecture for aircrafts, including at least one wheel, the architecture including:
- at least one brake provided with at least one hydraulic actuator for braking the wheel,
- at least one pressure source (Alim) adapted to deliver a hydraulic fluid at high pressure; and a normal braking hydraulic circuit (C1) including:
at least one pressure control servo valve (BCV) including:
a supply port (P) connected to the pressure source (Alim);
a return port (R);
a utilization port (U) connected to the braking hydraulic actuator; and
distribution means mounted so as to be mobile so as to connect the utilization port (U) either with the supply port (P) or with the return port (R);
the brake architecture further including a parking hydraulic circuit (C2) including:
a parking brake valve (PkBV) having a return port (R1) connected to a return circuit (CR) at a pressure the is low relative to said high pressure and an outlet port (Ps1) said outlet port (Ps1) of the parking brake valve (PkBV) being adapted to be connected selectively either to the pressure source (Alim) or to said return circuit (CR) via return oirt (R1) of the parking brake valve (PkBV);
characterized in that the outlet port (Ps1) of the parking brake valve (PkBV) is connected to the return port (R) of the pressure control servo valve (BCV).

2. The brake architecture according to claim 1, wherein the pressure source (Alim) includes a supply of hydraulic fluid at a pressure that is high relative to said low pressure and an accumulator of hydraulic fluid under pressure connected together by a pipe provided with a check valve allowing fluid to pass from the pressure source (Alim) toward the accumulator and preventing hydraulic fluid from passing from the accumulator toward the pressure source (Alim).

3. A hydraulic brake architecture for aircrafts, including at least one wheel, the architecture including:
at least one brake provided with at least one hydraulic actuator for braking the wheel,
at least one pressure source (Alim) adapted to deliver a hydraulic fluid at high pressure; and
a normal braking hydraulic circuit (C1) including:
at least one pressure control servo valve (BCV) including:
a supply port (P) connected to the pressure source (Alim);
a return port (R);
a utilization port (U) connected to the braking hydraulic actuator; and
distribution means mounted so as to be mobile so as to connect the utilization port (U) either with the supply port (P) or with the return port (R);
the brake architecture further including a parking hydraulic circuit (C2) including:
a parking brake valve (PkBV) having an outlet port (Ps1) adapted to be connected selectively either to the pressure source (Alim) or to a return circuit (CR) at a pressure that is low relative to said high pressure;
characterized in that the outlet port (Ps1) of the parking brake valve (PkBV) is connected to the return port (R) of the pressure control servo valve (BCV)., wherein the normal braking hydraulic circuit includes a fluid inlet control valve (SOV) having an inlet port (Pe2) connected to the supply source (Alim) and an outlet port (Ps2) connected to the supply port (P) of the pressure control servo valve (BCV),
the fluid inlet control valve (SOV) further including a return port (R2) connected to the outlet port (Ps1) of the parking brake valve (PkBV) and to the return port (R) of the pressure control servo valve (BCV), this fluid inlet control valve (SOV) selectively adopting:
a configuration of supplying the normal braking hydraulic circuit in which:
the connection between the inlet port (Pe2) and the outlet port (Ps2) of the control valve (SOV) is allowed; and
the connection of the return port (R2) of the fluid inlet control valve (SOV) with its inlet port (Pe2) and outlet port (Ps2) is not allowed; and
a configuration of cutting off the supply of the normal braking hydraulic circuit in which:
the connection between the inlet port (Pe2) and the outlet port (Ps2) of the control valve (SOV) is not allowed; and
the connection of the return port (R2) of the fluid inlet control valve (SOV) with its only outlet port (Ps2) is allowed.

4. The brake architecture according to claim 1, wherein the normal braking hydraulic circuit includes a fluid inlet control valve (SOV) having an inlet port (Pe2) connected to the supply source (Alim) and an outlet port (Ps2) connected to the supply port (P) of the pressure control servo valve (BCV), this fluid inlet control valve (SOV) selectively adopting:
a configuration of supplying the normal braking hydraulic circuit in which the connection between the inlet valve (Pe2) and the outlet valve (Ps2) of the control valve (SOV) is allowed; and
a configuration of cutting off the supply of the normal braking hydraulic circuit in which the connection between the inlet port (Pe2) and the outlet port (Ps2) of the control valve (SOV) is not allowed.

* * * * *